United States Patent [19]
Thomas

[11] Patent Number: 4,751,790
[45] Date of Patent: Jun. 21, 1988

[54] SNARE TRAP

[75] Inventor: Gerald A. Thomas, Lititz, Pa.

[73] Assignee: Woodstream Corporation, Lititz, Pa.

[21] Appl. No.: 397,247

[22] Filed: Jul. 12, 1982

[51] Int. Cl.$^4$ .......................................... A01M 23/34
[52] U.S. Cl. ........................................ 43/87; 43/85
[58] Field of Search .................. 43/87, 86, 85, 58, 15, 43/16; 267/155, 58

[56] References Cited

U.S. PATENT DOCUMENTS

| | | | |
|---|---|---|---|
| 157,973 | 12/1874 | Richardson | 43/86 |
| 371,086 | 10/1887 | McGary | 43/87 |
| 1,040,657 | 10/1912 | Ellison | 43/87 |
| 1,481,222 | 1/1924 | Odatey | 43/85 |
| 1,647,578 | 11/1927 | Penn | 43/87 |
| 2,146,019 | 2/1939 | Knippelmeir | 43/87 |
| 2,683,952 | 7/1954 | Armstrong | 43/87 |
| 2,723,486 | 11/1955 | Bouma | 43/85 |
| 3,060,623 | 10/1962 | Aldrich | 43/87 |
| 3,958,360 | 5/1976 | King | 43/87 |
| 4,180,937 | 1/1980 | Webster | 43/87 |
| 4,286,404 | 9/1981 | Novak et al. | 43/87 |
| 4,329,805 | 5/1982 | Novak | 43/87 |

FOREIGN PATENT DOCUMENTS

| | | | |
|---|---|---|---|
| 1108853 | 9/1981 | Canada | 43/87 |
| 1117759 | 2/1982 | Canada | 43/85 |
| 52806 | 1/1890 | Fed. Rep. of Germany | 43/86 |
| 1191167 | 4/1965 | Fed. Rep. of Germany | 43/86 |
| 945122 | 4/1949 | France | 43/86 |
| 8030 | of 1907 | United Kingdom | 43/87 |
| 444596 | 3/1936 | United Kingdom | 43/87 |

Primary Examiner—Kurt Rowan
Attorney, Agent, or Firm—Holman & Stern

[57] ABSTRACT

A snare-type animal trap is characterized by a spring noose-actuating spring arm which pivots well in excess of 90° from its set to its sprung positions. The spring arm is bent slightly to add to its effective sprung position angle. In a leg snare embodiment, a noose cable guide at the distal end of the spring arm includes a narrow surface from which two upwardly projecting bent guide members extend to define a slot for slidably guiding the cable. The cable is anchored at one end and has a noose formed at its free end by means of a slide member having two through-holes slidably surrounding the cable. A washer precludes passage of the free end of the cable through the first hole which is aligned with a channel defined between two fingers formed at the bifurcated end of the slide member. The fingers are curled back toward the first hole so that the cable can slidably pass through the first hole, the channel, and then through the second hole to form the noose. The channel formed by the curled fingers prevents the cable from pivoting when the trap is actuated and forces the noose to rise vertically.

22 Claims, 4 Drawing Sheets

SNARE TRAP

TECHNICAL FIELD

The present invention relates generally to snare-type animal traps and, more particularly, to improvements in such traps which permit more efficient trap actuation.

BACKGROUND OF THE INVENTION

Snare-type animal traps are well known in the prior art. Examples of such traps used as leg snares can be found in U.S. Pat. No. 3,060,623 to Aldrich, U.S. Pat. No. 4,286,404 to Novak, et al., and Canadian Patent No. 1,108,853 to Novak. These leg snare animal traps are characterized by a spring-biased spring arm which pivots upwardly when the trap is sprung to tighten a cable noose around the leg of the trapped animal. The cable is anchored at one end and has the noose at the other end. An intermediate portion of the cable is slidably guided at the distal end of the spring arm so that the noose can be tightened by the sprung spring arm. The cable must be readily removable from the guide by the resisting forces of the trapped animal so that the trap mechanism becomes free of the cable and is less likely to be damaged by the animal.

It is important in such leg snare traps that the spring arm be able to very quickly tighten the cable noose about the animal's leg when the trap is sprung in order to assure that the animal cannot escape. This requires that the spring arm move quickly through as large an angle as possible while pulling the loosely held cable in slidable engagement in the cable guide. It also requires that the cable noose rise vertically very quickly with the spring arm so that the cable does not fall out of the guide member. Moreover, it is important that the snare trap mechanism be sufficiently sturdy so that a trapped animal cannot permanently damage the mechanism even after it has been disengaged from the cable.

The trap disclosed in the Aldrich patent is fabricated from a plurality of steel rods which can be bent and distorted to preclude re-use. Moreover, Aldrich employs a U-shaped cable guide at the distal end of the spring arm which can result in inadvertent disengagement of the cable prior to or during the springing action of the trap. Specifically, the open end of the U-shaped guide member faces to the side, relative to the vertical spring arm pivot plane, so that the cable can readily be dis-lodged from the open side of the guide member.

The Novak, et al. U.S. patent and the Novak Canadian patent provide a more durable and damageresistant structure by providing a base on top of which a coiled torsion spring is mounted. The spring arm is pivotable by the spring and is rotatable relative to the base plate. In order to achieve a spring arm rotation sufficient to reliably and quickly tighten the cable noose, the Novak and Novak, et al. devices require a spring having in excess of ten (10) turns. In addition, the guide member forms at the distal end of the spring arm is in the form of a saddle with short upwardly-extending sides over which the cable can readily be pulled, resulting in undesirable disengagement of the cable from the trap mechanism.

Neck snare traps are similar in many respects to leg snare traps but are intended to quickly tighten about the neck, rather than the leg, of the trapped animal. In this respect, the noose of the neck snare is placed in a path or trail normally traveled by animals to be trapped such that a moving animal's head can enter and pull on the noose so as to actuate the trap. It is very important in a neck snare that the spring arm move quickly through as large an angle as possible while pulling the noose tightly around the neck of the trapped animal. More specifically, the neck snare is intended to kill the trapped animal and, therefore, the noose should tighten substantially instantly in order to assure a rapid and humane death. Examples of prior art neck snare traps may be found in U.S. Pat. Nos. 1,647,578 (Penn) and 3,958,360 (King).

The neck snare disclosed in the Penn patent relies on the resilience of a support pole, which is bent or flexed when the trap is set, in order to pull the noose about the animal's neck. In practice, the time required for the noose to tighten is much too long to be considered humane.

The snare disclosed in the King patent employs a spring-loaded pivotable bar or rod which pivots and pulls on the noose when the trap is sprung. The noose is tightened more quickly than is the case in the Penn device; however, it still does not effect the desired rapid and humane death.

SUMMARY OF THE INVENTION

It is an object of the present invention to provide a snare-type animal trap in which the movement of the spring effects reliable and rapid tightening of the cable noose.

It is another object of the present invention to provide a snare-type animal trap in which the cable is reliably engaged by the spring arm for purposes of springing the trap but is easily disengaged therefrom by a trapped animal.

It is still another object of the present invention to provide a snare-type animal trap in which positive actuation can be achieved with a minimum size spring.

It is yet another object of the present invention to provide a leg snare animal trap in which the cable noose is rapidly moved vertically upon actuation of the trap so as to minimize the possibility of escape by the animal which actuates the trap.

It is another object of the present invention to maximize the rapidity at which a cable noose can be tightened in a snare-type trap for a given pivot angle of a pivotable noose actuator rod.

Still another object of the present invention is to provide a neck snare trap in which the noose is rapidly tightened about the trapped animal's neck to ensure a humane death.

In accordance with the present invention, a snaretype trap includes a bent pivotable actuator arm which is spring-biased with respect to a frame member toward a sprung position away from the frame member. The bend in the actuator arm, which is on the order of 30°, is in the plane of pivotal movement in a direction away from the frame member. The bend extends the displacement of the distal end of the pivoted actuator rod when the trap is sprung and thereby pulls tighter on the noose.

In accordance with another aspect of the present invention, a leg snare trap includes a wound torsion spring which is disposed partially below the base plate to which it is mounted. A spring arm, which is formed integrally with the spring, is pivotable over an angle on the order of 150° between the set and spring positions and includes a bend in the pivot plane which increases the effective sprung angle. The location of part of the spring below the base plate serves to increase the permissible sprung angle of the spring arm for a given spring size.

In order to assure that the snare cable is not disengaged from the spring arm, an improved guide member is provided at the distal end of the spring arm. The guide member includes two (2) guide arms which project upwardly from a cable guide surface and are bent toward one another. The bent guide arms slidably capture the cable while permitting disengagement therebetween by a straining trapped animal.

An improved slide member is provided for forming the cable noose in the leg snare trap to assure that the noose is rapidly lifted vertically in response to actuation of the trap. One (1) end of the slide member is bifurcated and the resulting fingers are curled back against the slide member. A first hole is defined through the slide member at a location facing the ends of the curled fingers so that the cable can project through the first hole and be guided by the space between the curved fingers. The cable is then looped back to a second hole in the slide member to form the noose.

BRIEF DESCRIPTION OF THE DRAWINGS

The above and still further objects, features, and advantages of the present invention will become apparent upon consideration of the following detailed description of one embodiment thereof, especially when taken in conjunction with the accompanying drawings, wherein.

DESCRIPTION OF THE PREFERRED EMBODIMENTS

Figure 1:
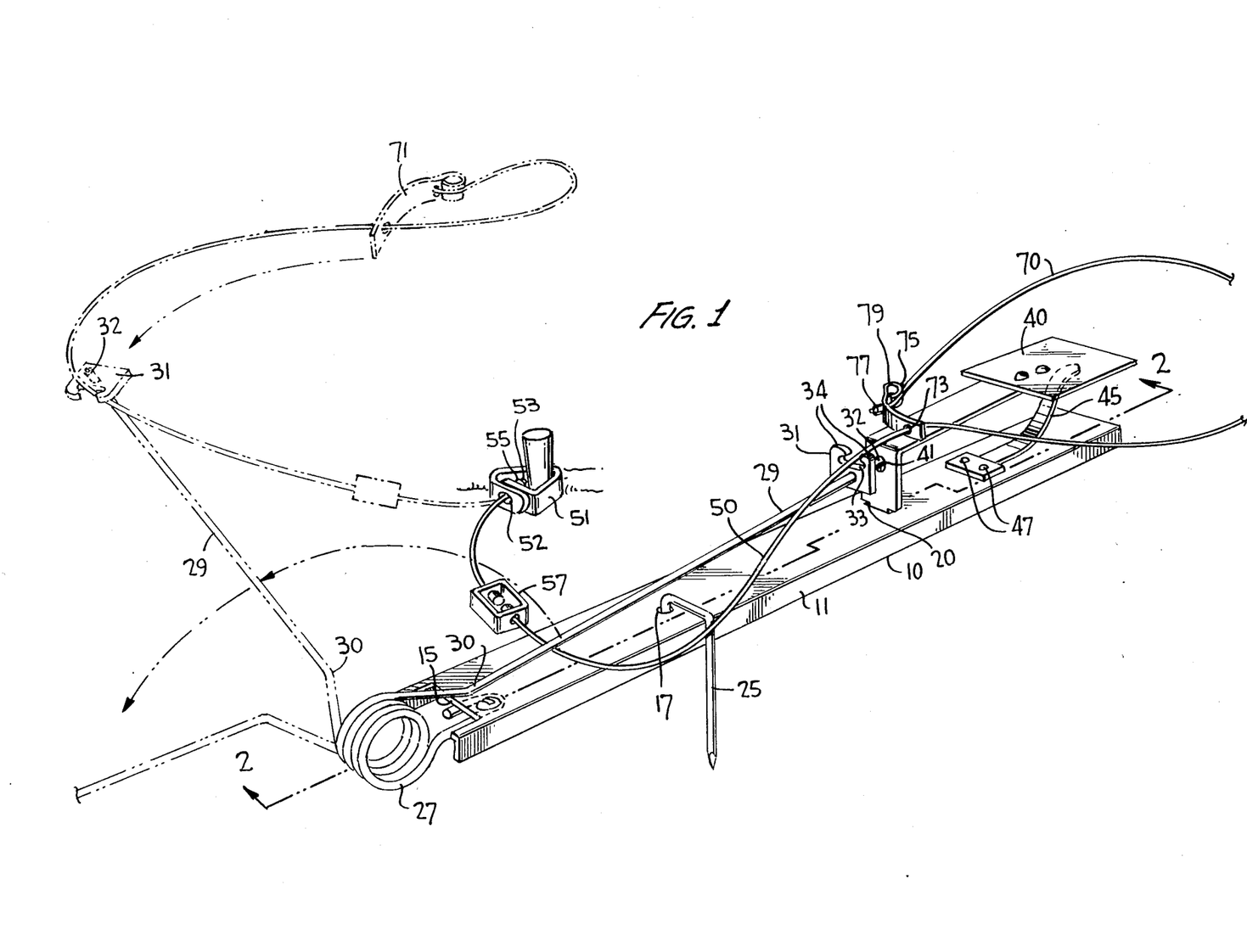
FIG. 1 is a view in perspective of a leg snare trap of the present invention shown in solid line in its set position and in phantom line in its sprung position.
Figures 2, 3, 4:
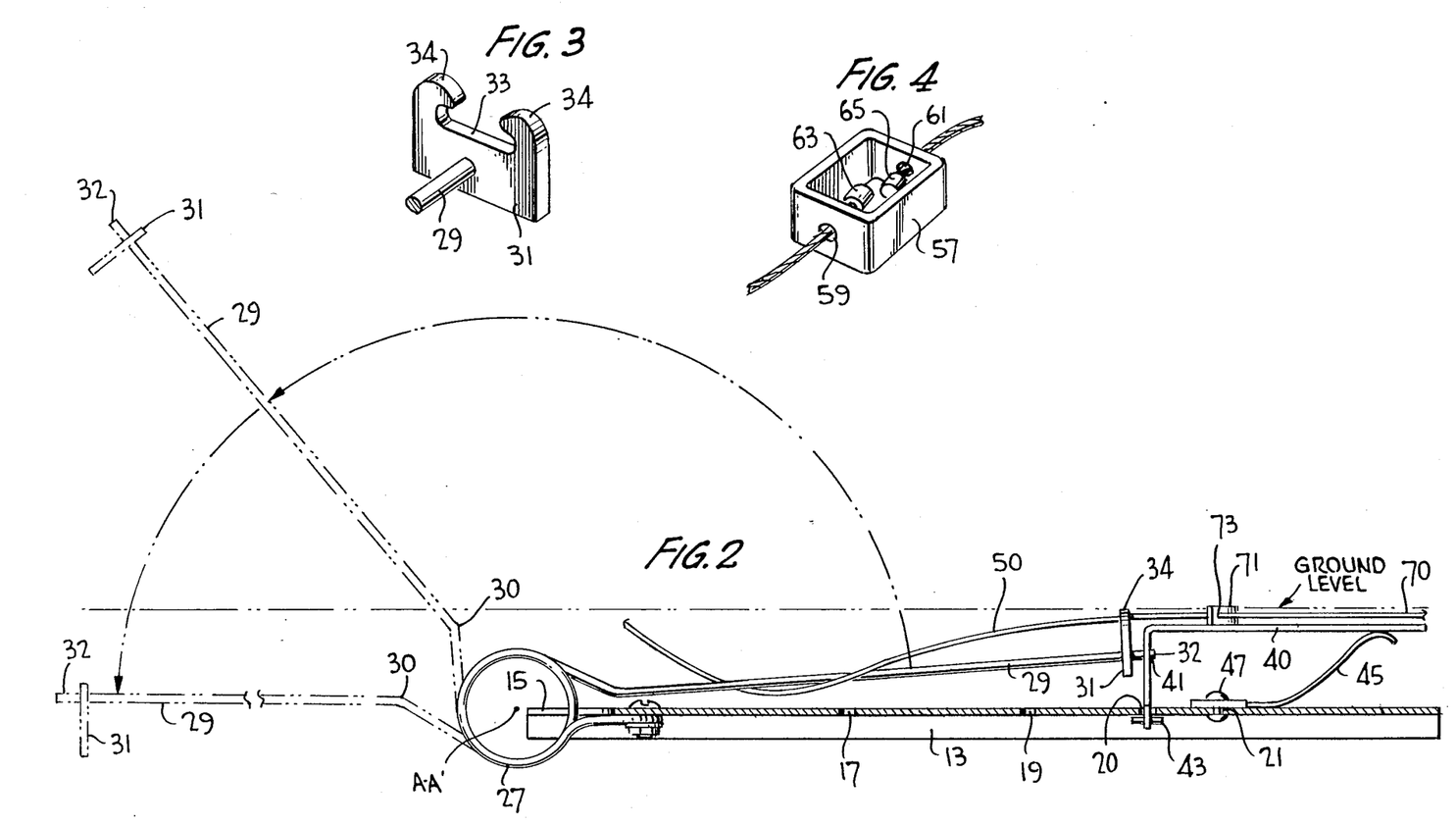
FIG. 2 is a side view in elevation showing the trap of FIG. 1 in solid lines in its set position and in phantom lines in its sprung position.
FIG. 3 is a view in perspective of a cable guide member employed in the trap of FIG. 1.
FIG. 4 is a view in perspective of a swivel member employed in conjunction with the trap of FIG. 1.

Referring to the drawings in greater detail, the leg snare trap of the present invention includes a base plate 10 having a generally elongated rectangular configuration with side runners 11 and 13 formed by bending the sides of the base plate downward. A slot or cut-away portion 15 of the plate extends longitudinally inward from one end thereof and is disposed substantially on the longitudinal axis of the base plate. A pair of spaced circular holes 17 and 19 extend top to bottom through the base plate along the longitudinal axis. A generally rectangular through hole 20 is spaced further along the axis. A pair of rivet holes 21, 23 are disposed symmetrically off-axis further along the length of the base plate.

A generally U-shaped wire spike 25 has its legs adapted to fit through either of holes 17 and 19. The base portion of the U-shaped spike has a length which is slightly greater than half the width of base plate 10 so that when one (1) leg of the spike is inserted through hole 17 or hole 19, the other leg of the spike extends past one (1) of the runners 11, 13 in a direction perpendicular to the base plate. Spike 25 is used to secure the base plate in the ground when the trap is being deployed by hammering the spike into the ground with one leg in either of holes 17, 19.

A helically-wound torsional spring 27 is wound about an axis A—A'. One (1) end of the wire forming the spring forms a U-shaped loop which is extended along the bottom surface of base plate 10 when the spring 27 is disposed partially within slot 15. More particularly, spring 27 is disposed with its axis A—A' disposed horizontal and generally perpendicular to the direction of the longitudinal axis of base plate 10. A portion of the spring 27 extends out from slot 15 beyond the end of the base plate. The U-shaped termination of the spring is secured to the underside of the base plate by means of a nut 26 which engages a screw 24 projecting through a suitably provided hole in the base plate. Importantly, apart from projecting beyond the end of the base plate, part of the coiled spring 27 projects below the base plate while part of the coiled spring 27 projects above the base plate. In the particular embodiment illustrated in the drawings, the axis A—A' of the spring 27 is at a vertical position which is substantially in the plane of the top surface of the base plate. This is not a limiting consideration for positioning the spring, it only being necessary that a substantial portion of the spring extend below the base plate. The other end of the spring 27 terminates in a spring arm 29 having a distal end 32. Spring arm 29 is part of the same wire which is coiled to form the spring 27. In the relaxed or torsionally unstressed condition of spring 27, spring arm 29 subtends an obtuse angle relative to the top surface of base plate 10. That angle is increased further by a small bend provided in the spring arm at a point 30 which is a relatively short distance from the coiled spring 27. In a typical embodiment, the angle subtended by the proximal portion (i.e., up to bend point 30) of the spring arm is 150°; the bend beyond bend point 30 is typically on the order of 30°, 35°, or the like. When spring 27 is torsionally stressed, spring arm 29 is pivotable in a vertical plane which is substantially parallel to or coincident with the longitudinal axis of the base plate 10. The bend in the spring arm is formed in this vertical plane so as to be additive to the angle subtended by the spring arm relative to the base plate. The spring axis A—A40 is perpendicular to this vertical pivot plane of spring arm 29.

A cable guide member 31 is disposed at the distal end 32 of spring arm 29. The guide member 31 takes the form of a small rectangular plate which is welded or otherwise secured so as to be oriented perpendicular to the spring arm. A guide surface or edge 33 faces perpendicular to the vertical pivot plane of the spring arm and in the direction of the bend provided in the spring arm at bend point 30. Thusly oriented, guide surface 33 of guide member 31 faces upward when the spring arm 29 is pivoted in a clockwise direction (as viewed in the drawings) to a position substantially parallel to the top surface of base plate 10. A pair of arm members 34 extend from opposite ends of guide surface 33 and are bent inward so as to define a relatively small space between them.

A pan-type trip lever 40 takes the form of a generally L-shaped member. A vertical portion of the trip lever is narrowed at its bottom so as to project through hole 20 in the base plate. This portion is apertured to receive a cotter pin 43 disposed at the underside of the base plate so as to preclude removal of the trip lever from the base plate. However, the engagement between the trip lever and base plate is sufficiently loose to permit considerable pivoting of the trip lever in a plane parallel to or coincident with the vertical pivot plane of the spring arm 29. The vertically-extending portion of the trip lever is provided with a recess or aperture 41 which is sized to receive the distal end 32 of spring arm 29 when the spring arm is forced against the bias of spring 27 to a horizontal position or a position wherein the spring arm is disposed parallel to the base plate 10. This is considered the set position of spring arm 21 which is held by the engagement in aperture 41 against the bias of spring 27. The spring arm 29 can be released from this set position by the exertion of a downward force on the horizontally-extending portion of the trip lever 40. A leaf spring 45 is secured to the top surface of base plate 10 by means of rivets 47 extending through holes 21 and 23. The leaf spring 45 curves upwardly to contact the underside of the horizontal portion of trip lever 40 to thereby provide a bias force in opposition to any force exerted downward on the trip lever. By properly selecting the constant of the leaf spring 45, the force exerted on trip lever 40 necessary to release spring arm 29 can be selected. The spring 45 thus permits selection of a certain minimum weight of an animal that can actuate or trigger the trap mechanism.

A metal cable 50 is provided with an anchor mechanism 51 at one end. The anchor mechanism includes an elongated rod of generally rectangular cross-section having through holes 52 defined at opposite ends. The rod is bent at three (3) locations such that its opposite ends overlap with holes 52 in alignment. Cable 50 passes slidably through holes 52 but is prevented from having its end. disengage anchor member 51. Specifically, the end of cable 50 is provided with a sleeve member 53 which is secured to the cable end. A nut or washer 55 is disposed concentrically about the cable and is precluded from sliding off the cable end by member 53. The nut or washer 55 is disposed between member 53 and the overlapped ends of member 51 so as to be captured therebetween so as to prevent disengagement of the cable end from the anchor member.

A swivel member 57 takes the form of an endless loop formed by a metal bar. In the particular embodiment illustrated, the endless loop has four (4) bends so as to form a generally square configuration. Through holes 59 and 61 are provided in two (2) opposite sides of the swivel member. Cable 50 is cut into two (2) sections, each of which extends into the interior of the swivel member through a respective hole 59, 61. Washers 63, 65 are secured to the ends of the two (2) cable sections within the swivel member so as to prevent disengagement of the two cable sections from the swivel member. As the name implies, swivel member 57 permits the cable to rotate about its axis without being weakened due to torsional binding. Such torsional stress is often applied to the cable when an animal is trapped and attempts to get loose from the cable.

The other end of the cable is formed in a noose or loop 70, which noose is formed with the aid of a slide member 71. Slide member 71 takes the form of an elongated metal member having a through hole 73 defined at one end and which is bifurcated at the other end. The bifurcation defines two (2) fingers 75 which extend from that end of the slide member in spaced relation. The fingers 75 are bent so as to curl back toward the slide member so that the space therebetween is generally arcuate. A locking member or washer 77 is secured to the end of the cable which extends through a further hole 79 defined through the slide member at a location between the distal ends of the curled back fingers 75. The cable thus extends through hole 79, the slot or space through fingers 75 and back through hole 73 to form the noose or loop 70.

When the trap is to be placed in use, the base plate 10 is placed in a hole or recession which is dug into the ground. The top surface of the base plate may be covered with dirt so as to conceal if from view. In this regard, the position of the spring 27 partially below the base plate permits the spring to be completely covered by loosely packed dirt so as to conceal the spring from the view of an animal. The spring arm is then placed in its set position wherein distal end 32 is disposed in aperture 41 of the trip lever 40. The upper surface of trip lever 40 is either exposed or loosely covered with leaves or the like, so as to be readily rotatable against the bias of leaf spring 45 when stepped upon by an animal. The loose engagement of the trip lever in aperture 20 is maintained by the presence of the runners formed by side walls 11 and 13. More specifically, when the base plate 10 is placed in the suitably dug hole or channel in the ground, the undersideof the base plate is raised above the dirt by the presence of the runners, so that the dirt does not pack against the bottom of the base plate. The portion of the trip lever extending through aperture 20 and cotter pin 43 are therefore raised above the dirt which, if packed tight against the undersurface of the base plate, could interfere with the free movement of the trip lever.

With the base plate and spring arm mechanism thus deployed, cable 50 is anchored by means of a stake driven through the enclosed space defined by anchor 51. The distal end of anchor 51 is preferably pointing perpendicularly away from the longitudinal axis of base plate 10 so that the cable 50 extending therefrom is oriented perpendicular to the base plate. The cable is inserted in guide member 31 between arm members 34 such that the noose or loop 70 surrounds the trip lever 40 as illustrated. Suitable bait is placed about the noose in positions which would require the animal to step within the noose and on the bait pan trip lever 40 when picking up the bait. When an animal steps on the trip lever, the horizontally-extending portion of the trip lever rotates downward against the bias action of spring 45 to move aperture 41 out of engagement with the distal end 32 of spring arm 29. With the spring arm thus released, it rotates upward to its sprung position, carrying the cable upward with it. Since the noose surrounds the animal's leg, the sharp upward jerk of the cable causes the noose to tighten around the animal's leg. With the inevitable struggling to be free, the animal will pull the cable from between the arm members 34 of guide member 31 so that the cable is totally free of the spring and base plate mechanism. That mechanism, which had been anchored into the ground by wire spike 25, remains relatively safe from damage since the animal's attention will be largely directed to the now separate noose surrounding its leg. This noose is part of cable 50 which is staked into the ground through anchor 51. The animal is thus trapped in the snare and unable to escape. Twisting and turning of the cable by the animal does not weaken the cable because the cable is in two (2) sections which are mutually rotatable at swivel member 57. The animal will remain virtually unharmed until appropriately collected by the trapper.

The position of spring 27 such that it extends partially below and partially above the base plate 10 can be seen to have two (2) distinct advantages. First, as noted above, the spring has a lower profile with respect to the base plate than would be the case for a spring mounted on the top surface of the base plate. Consequently, the spring can be more easily covered and hidden from view when the base plate is deployed as part of the trap. Second, as noted above, for a given size spring with a given number of turns, the angle of pivot permitted for the spring arm 29 is greater than is the case for a spring mounted on the top surface of the base plate. A large angle, on the order of 120° to 150° and certainly greater than 90°, is important in order that a rapid and forceful pulling of the cable be effected when the trap is triggered. Clearly, it is also important to minimize the size of the spring required to achieve the desired angle. This angle is further increased by the bend at point 30 in the spring member, thereby adding to the rapidity and strength of the force which causes the noose to tighten around the animal's leg.

The space between the covering arm members 34 of guide member 31 is preferably just equal to or slightly smaller than the diameter of cable 50 so that the cable can be pulled through that space by the struggling trapped animal, but is not dis-lodged from the guide member by the upward pivoting of spring arm 29 or inadvertent movement of the dirt or other covering of the trap when it is set.

The curling of the fingers 75 formed by the bifurcation in slide member 71 permits the cable to extend between the space between the fingers after passing through hole 79. The cable is thus readily retained in this space during actuation and is not twisted so that the noose can be drawn rapidly vertically along with the spring arm when the trap is triggered.

The restoring force exerted by the spring was tested using a hard drawn spring wire having a wire diameter of 0.160±0.002 inches, an inner diameter of 1⅛ inch for coil 27 which was configured with the number of turns illustrated and a spring arm 29 having a total length of 8⅝ inches and a length of 7⅛ inches from the 30° bend 30 to distal end 32. The restoring force was measured at different angular positions from the sprung position and was three (3) pounds at 30°, six (6) pounds at 60°, nine (9) pounds at 90°, eleven (11) pounds at 120°, and thirteen (13) pounds at 150°.

Figures 5, 6:
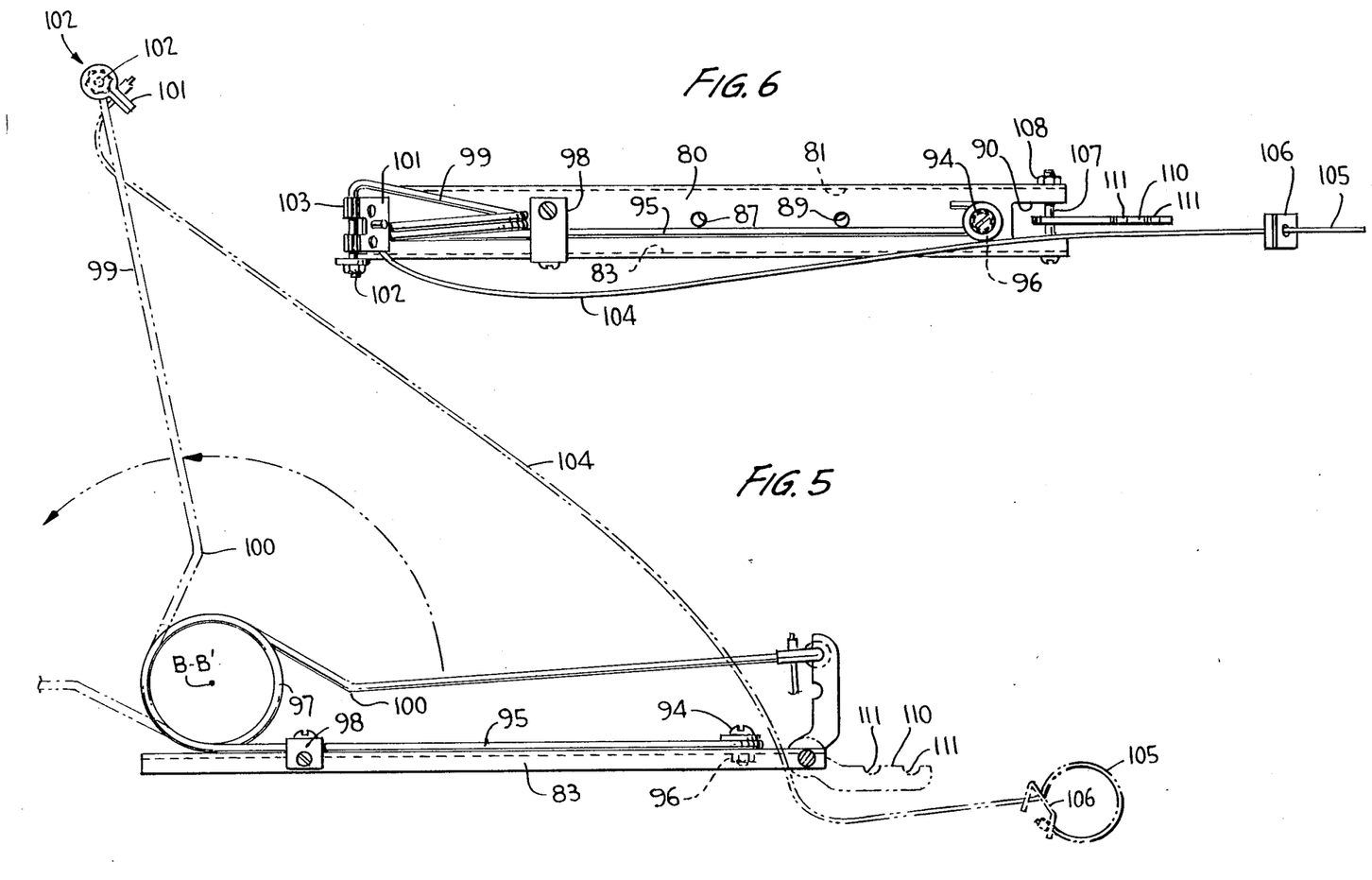
FIG. 5 is a side view in elevation showing a neck snare trap of the present invention in solid lines in its set position and in phantom lines in its sprung position.
FIG. 6 is a top view in plan of the trap of FIG. 5.
Figure 7:
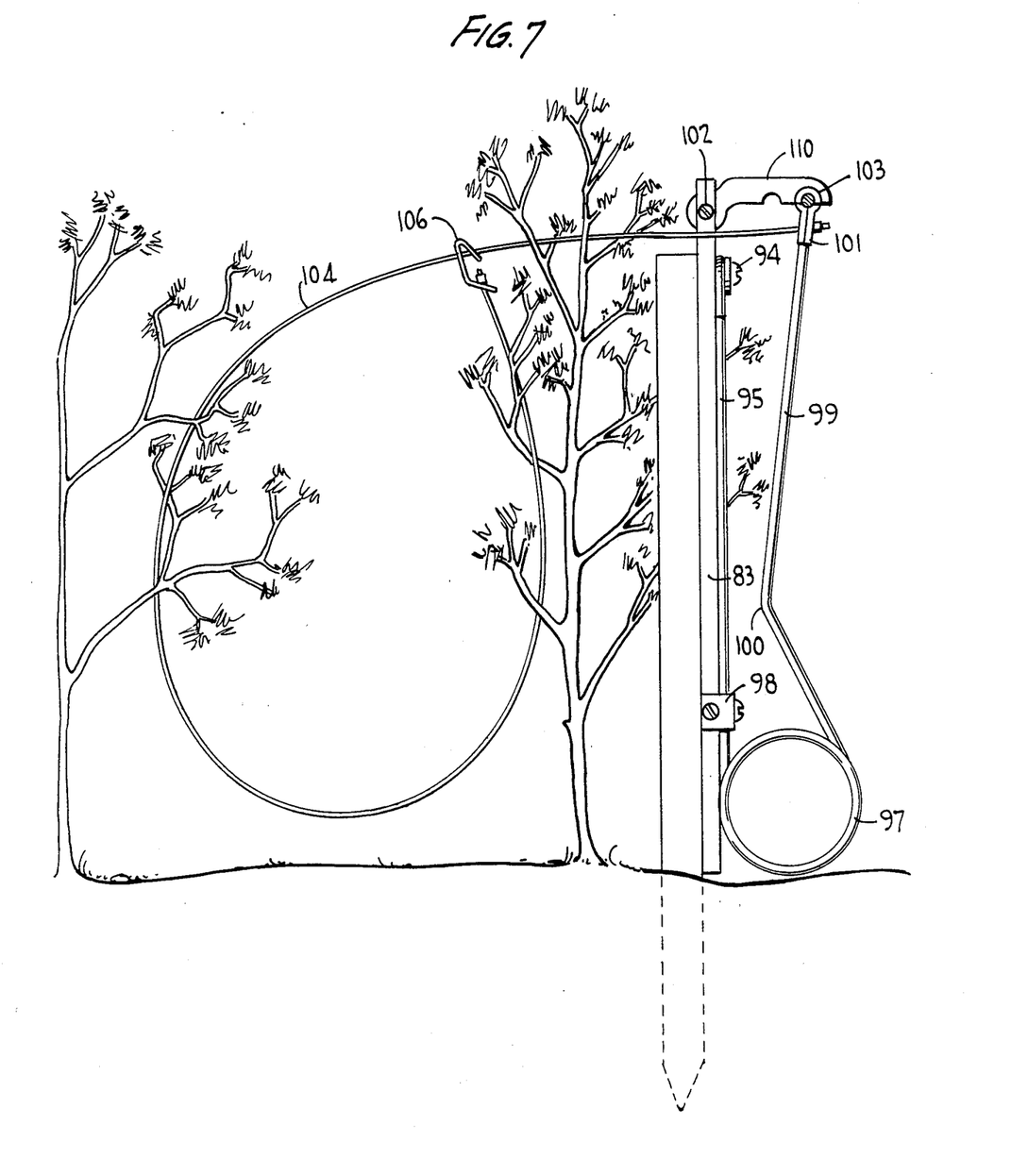
FIG. 7 is a diagrammatic illustration of the trap of FIG. 5 shown installed in its set position.

Referring to FIGS. 5, 6 and 7 of the accompanying drawings, a neck snare embodiment of the present invention includes a base plate 80 having a generally elongated rectangular configuration with side runners 81 and 83 formed by bending the sides of the base plate downward. A pair of spaced circular holes 87, 89 extend top to bottom through the base plate along the longitudinal axis of the plate. A generally rectangular slot 90 is defined by a cut-away portion of one end of the base plate.

Wood screws (not shown) are employed to secure base plate 80 to a post or the like through either or both of holes 87, 89. Specifically, the screws are used to secure the base plate in a vertical position to a tree or post when the trap is being deployed (as illustrated in FIG. 7).

A helically-wound torsional spring 97 is wound about an axis B—B'. One leg 95 of the wire forming the spring forms a U-shaped loop at its end and is extended along the top surface of the base plate with the spring 97 disposed at the end of the base plate opposite slot 90. More particularly, spring 97 is disposed with its axis B—B' disposed horizontally and generally perpendicular to the direction of the longitudinal axis of the base plate 80. Spring 97 and its leg 95 extend entirely above the base plate, unlike spring 27 of FIG. 1. The U-shaped termination of the spring leg 95 is secured to the top of the base plate by means of a nut 96 which engages a screw 94 projecting through a suitably provided hole in the base plate proximate slot 90. A bracket 98 is secured by means of nuts and bolts to the base plate to hold the proximal end of leg 95 against the base plate. Apart from not projecting beyond the end of the base plate, unlike spring 27, no part of the coiled spring 97 projects below the base plate. The other end of the spring 97 terminates in a spring arm 99 having a stop member in the form of a trigger clip 101 secured to its bent distal end. Spring arm 99 is part of the same wire which is coiled to form the spring 97. In the relaxed or torsionally unstressed condition of spring 97, spring arm 99 subtends an obtuse angle relative to the top surface of base plate 80. That angle is increased further by a small bend provided in the spring arm at a point 100 which is located at a relatively short distance from the coiled spring 97. In a typical embodiment, the angle subtended by the proximal portion (i.e., up to bend point 100) of the spring arm is 120°; the bend beyond point 30 is typically on the order of 35°. When spring 97 is torsionally stressed, spring arm 99 is pivotable in a vertical plane which is substantially parallel to or coincident with the longitudinal axis of the base plate. The bend in the spring arm is formed in this vertical plane so as to be additive to the angle subtended by the spring arm relative to the base plate. The spring axis B—B' is perpendicular to this vertical pivot plane of spring arm 99.

A trigger clip 101 is disposed at the distal end of spring arm 99. The trigger clip takes the form of a small rectangular plate which is rolled at one edge 103 to surround the bent distal end of the spring arm. A cut-out portion is provided in the rolled edge 103 to expose a part of the bent distal end 102 of the spring arm. One end of a cable 104 is secured to the trigger clip plate. The other end of cable 104 extends through slot 90 to the underside of base plate 80 where a noose 105 is formed in the cable. A slide member 106 is employed at the end of the cable to form the noose. Cable 104 is retained in slot 90 by a threaded bolt 107 which extends across the slot transversely through suitable aligned holes in runners 81, 83. Bolt 107 is threadedly engaged and retained in place by a nut 108.

A dog member 110 has one end mounted for free rotation on bolt 107. One edge of the dog member is provided with one or more recesses 111 which are contoured to match the periphery of a part of the bent distal end 102 of the spring arm which is exposed by the cut-out portion of the rolled edge 103 of trigger clip 101. The trap is set by rotating the spring arm 99 toward base plate 80 and rotating dog member 110 until it engages the distal end 102 of the spring arm. With the trap thusly set, any pull on cable 104, as would be occasioned by an animal having noose 105 around its neck, pulls the spring arm free of the recess 111 in dog member 110. This releases the spring arm 99 which rapidly pulls the noose tightly about the snared animal's neck.

Bend 100 is of crucial importance in that it increases the effective displacement of the distal end of spring arm 99 from the slot 90 in the sprung conditon of the trap. As a consequence, cable 104 is pulled through this greater distance by the spring arm and effectively increases the rapidity at which the noose is tightened about the neck of the snared animal.

While I have described and illustrated a specific embodiment of my invention, it will be clear that variations of the details of construction which are specifically illustrated and described, may be resorted to without departing from the true spirit and scope of the invention as defined in the appended claims.

I claim:

1. A snare-type animal trap comprising:
   a base plate;
   a spring arm pivotally mounted at one end on the base plate and having guide means secured at the other end for slidably guiding a cable, the spring arm being mounted for swinging movement in a substantially vertical plane between a first limit position in which it is substantially horizontal and a second limit position in which it extends generally upward at an angle in excess of 90° relative to said first position when unimpeded by a snared animal, said spring arm having a permanent bend in said vertical plane, which bend directs the distal end of the spring arm away from said base plate in said first position;
   spring means for biasing the spring arm to the second position;
   a pan-trip lever movable secured to said base plate and movable between an upper set position in which the lever is adapted to cause the spring arm to be retained in said first position against the urging of the spring means, and a lower sprung position in which the spring arm is released; and
   a cable having anchor means at one end and defining at the other end a noose adapted to be placed so as to surround said trip lever.

2. The animal trap according to claim 1, wherein said guide means comprises a guide member in which said cable is slidably disposed, said guide member having a guide surface from which two upwardly projecting spaced arm members extend, said arm members being bent such that the distal ends of the arm members converge toward one another, wherein the arm members and the guide surface define a slidable guide for said cable.

3. The animal trap according to claims 1 or 2, wherein said noose at said other end of said cable is formed through a slide member having first and second sides and a bifurcated first end forming two spaced finger-like members which are curled back towards said second side of said slide member such that the finger-like members are spaced from each other by a distance which is slightly greater than the diameter of the cable, said slide member having first and second apertures defined therethrough, said first aperture being at a location facing the space between the distal ends of said finger-like members, wherein said cable passes from said first side to said second side of said slide member to said first aperture, to the space between the curled finger-like members, and then from the second side to the first side of slide member through said second aperture, and wherein said cable includes stop means secured at said other end to prevent said other end from passing from said first side to said second side of said slide member while permitting said cable to freely rotate in said first aperture.

4. The animal trap according to claim 3, wherein said base plate has top and bottom surfaces, wherein said trip lever is disposed above said top surface proximate one end of said base plate, wherein said spring means comprises a helically-wound cylindrical spring with plural turns which are wound about a generally horizontal axis extending perpendicular to said vertical plane, said spring having a first end secured to said bottom surface of said base plate, and a second end comprising said spring arm, and wherein a part of the cylinder formed by the helical windings of the spring extends below said bottom surface.

5. The animal trap according to claim 4, wherein said permanent bend is an acute angle.

6. The animal trap according to claim 5, wherein said acute angle is on the order of 30°.

7. The animal trap according to claim 1, wherein said base plate has top and bottom surfaces, wherein said trip lever is diposed above said top surface proximate one end of said base plate, wherein said spring means comprises a helically-wound cylindrical spring with plural turns which are wound about a generally horizontal axis extending perpendicular to said vertical plane, said spring having a first end secured to said bottom surface of said base plate, and a second end comprising said spring arm, and wherein a part of the cylinder formed by the helical windings of the spring extend below said bottom surface.

8. The animal trap according to claim 7, wherein said permanent bend is an acute angle.

9. The animal trap according to claim 8, wherein said acute angle is on the order of 30°.

10. The animal trap according to claim 1, wherein said permanent bend is an acute angle.

11. A snare-type animal trap comprising:
    a base plate having top and bottom surfaces and a slot defined therein through said top and bottom surfaces;
    a helically-wound torsion spring having plural turns which are wound about a spring axis which extends horizontally in use;
    means securing said spring to said base plate in said slot such that one part of each of the turns of the spring is disposed above said top surface and another part of each of the turns of the spring is disposed below said bottom surface;
    a spring arm extending from one end of said spring above said top surface so as to be pivotally movable between first and second positions in a plane which is perpendicular to said spring axis, said first position corresponding to a torsionally stressed condition of said spring and in which said spring arm is disposed generally parallel to said top surface, said second position corresponding to a torsionally relaxed condition of said spring in which said spring arm is disposed at an angle in excess of 90° and less than 180° relative to the first position of said spring arm;
    a trip lever adapted to move above said top surface between an upper set position in which the lever is adapted to cause the spring arm to be retained in said first position against the urging of the spring means, and a lower sprung position in which the spring arm is released; and
    a cable having anchoring means at one end and defining a noose at the other end which is adapted to be placed so as to surround said trip lever;
    said spring arm being bent at an acute angle in said vertical plane in a direction which is away from said base plate when said spring arm is in said first position.

12. A snare-type animal trap comprising:
a base plate having top and bottom surfaces and a slot defined therein through said top and bottom surfaces;
a helically-wound torsion spring having plural turns which are wound about a spring axis which extends horizontally in use;
means securing said spring to said base plate in said slot such that one part of each of the turns of the spring is disposed above said top surface and another part of each of the turns of the spring is disposed below said bottom surface;
a spring arm extending from one end of said spring above said top surface so as to be pivotally movable between first and second positions, in a plane which is perpendicular to said spring axis, said first position corresponding to a torsionally stressed condition of said spring and in which said spring arm is disposed generally parallel to said top surface, said second position corresponding to a torsionally relaxed condition of said spring in which said spring arm is disposed at an angle in excess of 90° and less than 180° relative to the first position of said spring arm;
a trip lever adapted to move above said top surface between an upper set position in which the lever is adapted to cause the spring arm to be retained in said first position against the urging of the spring means, and a lower sprung position in which the spring arm is released; and
a cable having anchoring means at one end and defining a noose at the other end which is adapted to be placed so as to surround said trip lever;
said spring arm having a distal end with cable guide means secured thereto, said cable being slidably extended through said guide means, said guide means comprising a guide member in which said cable is slidably disposed having a guide surface from which two upwardly projecting spaced arm members project, said arm members being bent such that the distal ends of the arm members converge toward one another, wherein the arm members and the guide surface define a guide through which the cable is slidably guided.

13. The animal trap according to claim 12, wherein said angle is approximately 150°.

14. The animal trap according to claim 12, wherein said spring arm is bent at an acute angle in said vertical plane in a direction which is away from said base plate when said spring arm is in said first position.

15. The animal trap according to claim 14 or 11, wherein said acute angle is on the order of 35°.

16. A snare-type animal trap comprising:
a base plate;
a spring arm pivotally mounted at one end to the base plate and having means at the other end for slidably guiding a cable, the spring arm being mounted for swinging movement in a substantially vertical plane between a first position in which it is substantially horizontal and a second position in which it extends generally upward;
spring means biasing the spring arm towards said second position;
a trip lever mounted to be movable between an upper set position in which the lever is adapted to cause the spring arm to be retained in said first position against the urging of said spring means, and a lower sprung position in which the spring arm is released; and
a cable having anchoring means at one end and defining at the other end a noose adapted to be placed so as to surround said trip lever;
wherein said guide means comprises a guide member in which the cable is slidably disposed having a guide surface from which two upwardly projecting spaced arm members project, said arm members being bent such that the distal ends of the arm members converge toward one another, wherein the arm members and the guide surface define a guide through which the cable is slidably mounted.

17. The animal trap according to claim 16, wherein said spring arm in said second position subtends an angle of at least 150° with said spring arm in said first position.

18. The animal trap according to claim 17, wherein said base plate has top and bottom surfaces, wherein said trip lever is disposed above said top surface proximate one end of said base plate, wherein said spring means comprises a helically-wound cylindrical spring with plural turns which are wound about a generally horizontal axis extending perpendicular to said vertical plane, said spring having a first end secured to said bottom surface of said base plate, and a second end comprising said spring arm, and wherein a part of the cylinder formed by the helical windings of the spring extend below said bottom surface.

19. The animal trap according to claim 18, wherein said spring arm has a permanent bend in said vertical plane, and wherein said permanent bend is a small acute angle.

20. A snare-type animal trap comprising:
a base plate;
a spring arm having a distal end and pivotally mounted at one end on the base plate and having cable retaining means secured at the other end for engaging a cable, the spring arm being mounted for swinging movement in a pivot plane between a first limit position in which said distal end is substantially adjacent said base plate and a second limit position in which said distal end extends away from said base plate at an angle in excess of 90° relative to said first position when unimpeded by a trapped animal, said spring arm having a permanent bend in said pivot plane, which bend directs the distal end of the spring arm away from said base plate in said first position;
spring means for biasing the spring arm toward said second position;
trigger means movably secured to said base plate and movable between a set position, in which the trigger means is adapted to cause the spring arm to be retained in said first position against the urging of the spring means, and a sprung position in which the spring arm is released; and
a cable having one portion adapted to move with said cable retaining means and another portion forming a noose.

21. The animal trap according to claim 20, wherein said permanent bend is an acute angle.

22. The animal trap according to claim 21, wherein said acute angle is on the order of 30°.

* * * * *